United States Patent Office 2,899,411
Patented Aug. 11, 1959

2,899,411

POLYURETHANE ELASTOMERS FROM HYDROXYL POLY(ALKYLENE OXIDES)S, ALIPHATIC GLYCOLS AND DIPHENYL DIISOCYANATES

Charles S. Schollenberger, Cuyahoga Falls, Ohio, assignor to The B. F. Goodrich Company, New York, N.Y., a corporation of New York No Drawing. Application July 30, 1956
Serial No. 600,659

8 Claims. (Cl. 260—77.5)

This invention relates to novel and improved polyurethane elastomers which are derived from hydroxyl poly(alkylene oxide)s, aliphatic glycols and diphenyl diisocyanates, and to methods for the preparation of such elastomeric polyurethanes.

U.S. Patents 2,692,873 and 2,692,874 disclose elastomeric condensation products obtained by reacting polyalkylene ether glycols, arylene diisocyanates and water. The processes described in these patents to make elastomeric polyurethanes require water and acidic conditions. The products so prepared are then vulcanized with additional organic diisocyanate to develop optimum physical properties.

It has now been discovered that novel and improved elastomeric polyurethanes may be prepared by reacting together a mixture of certain hydroxyl poly(alkylene oxide)s and glycols with diphenyl diisocyanates in the absence of water and acidic materials. The resulting elastomeric polyurethanes have high tensile strengths and an excellent balance of other desirable physical and chemical properties and do not require a vulcanization step. Such products are readily processable in the usual processing equipment such as calenders and extruders and are easily molded and remolded.

The novel elastomers of this invention are derived from specific reactants in critical ratios. The elastomers are prepared by reacting in the defined ratios, a mixture of 1.0 mol of a hereinafter defined hydroxyl poly(polymethylene oxide) having a molecular weight between about 800 and about 4000 and about 0.5 to 9.0 mols of an aliphatic glycol containing from 4 to 10 carbon atoms with about 1.5 to 10 mols of a diphenyl diisocyanate. The ratio of glycol to diphenyl diisocyanate is critical and the recipe employed is balanced so that there is essentially no free unreacted diisocyanate or glycol remaining after the reaction to form the novel elastomers of this invention. The reactants should also be substantially free of moisture. No further treatment is required to develop the outstanding physical properties of the elastomers of this invention.

The hydroxyl poly(polymethylene oxide)s preferred for use in this invention are essentially linear hydroxyl terminated materials having ether linkages as the major linkage joining carbon atoms, as O, and having a molecular weight between about 800 and 4000, preferably the hydroxyl poly(polymethylene oxide) has a molecular weight of from about 900 to about 3000. The hydroxyl poly(polymethylene oxide) used in the practice of the invention include hydroxyl poly(trimethylene oxide), hydroxyl poly(tetramethylene oxide), hydroxyl poly(pentamethylene oxide), hydroxyl poly(hexamethylene oxide), and the like, of the formula $HO[(CH_2)_nO]_xH$ wherein $n$ is a number from 3 to 6 and $x$ is an integer of greater than 7 and of a value equivalent to a compound total molecular weight of about 800 to 4000. Hydroxyl poly(ethylene oxide)s and hydroxyl poly(1,2-propylene oxide)s, i.e.

where $x$ is an integer, generally are not satisfactory to make the desired products. Prior to reaction, the hydroxyl poly(polymethylene oxide)s are preferably extracted with water or treated with cation exchange resins, active earths and the like to provide materials of uniform reactivity with the diphenyl diisocyanates and are dried before use. Mixtures of hydroxyl poly(polymethyleneoxide)s may be used. The ratios of reactants are based on one mol of the hydroxyl poly(polymethylene oxide).

In the practice of the invention, and a critical feature thereof, an aliphatic glycol in an amount from about 0.5 to 9.0 mols per mol of hydroxyl poly(polymethylene oxide) is employed. An alkylene glycol is mixed with the hydroxyl poly(polymethylene oxide) prior to reaction with the diphenyl diisocyanate. Aliphatic glycols containing 4 to 12 carbon atoms are contemplated for use in this invention. The glycol preferred for this purpose is butanediol-1,4. Other glycols which may be employed include pentanediol, hexanediol, octanediol, dodecanediol and the like which preferably contain the hydroxyl groups in terminal position. A valuable group of glycols are alkylene glycols of the formula $$HO(CH_2)_nOH$$

wherein $n$ is a number from 4 to 6.

The specific diisocyanates employed to react with the hydroxyl poly(polymethylene oxide) and glycol are also critical and necessary in order to obtain the outstanding organic diisocyanate-linked elastomers of this invention. A diphenyl diisocyanate such as a diphenyl methane diisocyanate, diphenyl methane-p,p′-diisocyanate, dichlorodiphenyl methane diisocyanate, dimethyl diphenyl methane diisocyanate, diphenyl dimethyl methane diisocyanate, bibenzyl diisocyanate, bitolylene diisocyanate, diphenyl ether diisocyanate and the like of the formula

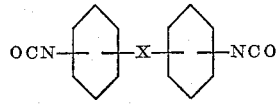

wherein X may be a valence bond, an alkylene radical containing preferably 1 to 5 carbon atoms, NR where R is an alkyl radical, oxygen, sulfur, $SO_2$ and the like; and the isocyanate groups are preferably in a para-position. Preferred are the diphenyl methane diisocyanates and excellent results are obtained from diphenyl methane-p,p′-diisocyanate. When other organic diisocyanates different in structure from the diphenyl diisocyanates of the types described above are employed, the novel products of this invention are not obtained.

The ratio of reactants employed, while critical, may be varied from about 1.5 to 10 mols of diphenyl diisocyanate per mol of hydroxyl poly(polymethylene oxide) with from about 0.5 to 9 mols of glycol, the amount of glycol used depending in part upon the molecular weight of the hydroxyl poly(polymethylene oxide) employed. The amount of diphenyl diisocyanate used is in turn dependent upon the total amount of glycol and hydroxyl poly(polymethylene oxide) and should be a molar amount equivalent to these latter two reactants so that there are essentially no free unreacted isocyanate and hydroxyl groups remaining in the reaction product. A convenient method for determining how much glycol to add to the hydroxyl poly(polymethylene oxide) prior to reaction of the mixture of hydroxyl poly(polymethylene oxide) and glycol with the diphenyl diisocyanate, to obtain optimum products of this invention, is to add enough glycol to the hydroxyl poly(polymethylene oxide) so that the mixture has an average hydroxyl number molecular weight of about 450 to 600 and more preferably from about 500 to about 550, average about 535. It will be apparent that the higher the molecular weight of the hydroxyl poly(polymethylene oxide), the more glycol that will be required to obtain the desired hydroxyl content (average molecular weight) of the mixture of glycol and hydroxyl poly(polymethylene oxide). Such mixtures should have a hydroxyl number from about 185 to 250 and more preferably from about 200 to about 225. To this mixture there is then added an equivalent amount of a diphenyl diisocyanate which will be between about 1.5 and 10.0 mols of diphenyl diisocyanate and more preferably between 2.0 and 4.5 mols of diphenyl diisocyanate. Ratios of the three reactants employed to obtain the products of this invention may vary from 1.5 mols of diphenyl diisocyanate, 1.0 mol of hydroxyl poly(polymethylene oxide) and 0.5 mol of glycol to 10.0 mols of diphenyl diisocyanate, 1.0 mol of hydroxyl poly(polymethylene oxide) and 9.0 mols of glycol. The amount of diphenyl diisocyanate in each case depending upon the hydroxyl number molecular weight of the hydroxyl poly(polymethylene oxide) and glycol mixture. More preferred are molar ratios of 1.0 mol of hydroxyl poly(polymethylene oxide) of a molecular weight from about 800 to 4000, from about 2.0 to 4.5 mols of diphenyl diisocyanate and from about 1.0 to 3.5 mols of an aliphatic glycol containing 4 to 10 carbon atoms. When employing hydroxyl poly(polymethylene oxide) of molecular weight of about 900 to about 3000, a preferred recipe for an elastomer product having an optimum balance of physical properties employs about 2.0 to 3.0 mols of diphenyl methane-p,p'-diisocyanate, 1.0 mol of hydroxyl poly(polymethylene oxide) and about 1.0 to 2.0 mols of butanediol-1,4.

As is apparent from the above recited ratios of reactants for preparing the unique elastomers of this invention, a product is obtained in which there is essentially no free or unreacted diisocyanate or glycol. This is an essential feature of this invention. An excess of diisocyanate greater than that required to react with the hydroxyl poly(polymethylene oxide) results in products which have a poor balance of useful physical properties. Of course, a small amount of unreacted isocyanate groups may be tolerated but it is desirable that they are essentially reacted. Likewise, excess free unreacted glycol results in products which are likewise less valuable. An excess of either glycol or diisocyanate of less than about 5 percent above that required for complete utilization of the reactants is desirable. Preferably, the molar amount of hydroxyl poly(polymethylene oxide) and glycol combined is substantially equivalent to the molar amount of diphenyl diisocyanate employed. More preferred, of course, are equimolar reacting ratios of all reactants. The resulting elastomeric polyurethanes are chemically resistant, have tensile strengths in the range of 5000 p.s.i. and higher, have Shore "A" Durometer hardness values of about 50 to 95, are readily processable and have outstanding abrasion resistance.

The reaction employed to prepare the novel products of the invention should be conducted under anhydrous conditions with dry reactants, that is, that the reaction mixture is substantially free of water. It is recognized that as a practical matter it is difficult to conduct such a reaction with absolutely dry reactants under completely anhydrous conditions so the requirements of this invention are met when the reaction mixture is essentially free of water. It should be noted that when the reaction is substantially complete it is not necessary to rigidly guard against the introduction of water into the reaction mixture. As a guide, there should be less than about 0.1% water present in the reaction mixture.

*Example I*

A mixture, in the specified molar ratios, of 120 grams (1.0 mol) of dry, water extracted, hydroxyl poly(tetramethylene oxide), molecular weight 3020, and 3.57 grams (1.0 mol) of butanediol-1,4 is melted in a kettle and stirred with a spiral ribbon stirrer for about 20 minutes at a pressure of 5 to 6 mm. at 100 to 110° C. to remove moisture. To this mixture there is then added 20.14 grams (2.0 mols) of diphenyl methane-p,p'-diisocyanate. This mixture is stirred for about 1 minute and is then poured into a silicone coated can which is promptly sealed with a friction top and the can placed in a 140° C. oven for 3.5 hours. At the end of this time the product is cooled and there is obtained a clear snappy elastomer having a Shore "A" hardness 65 which can be milled satisfactorily at 360° F. This material may be extruded at high rates to form elastic extrusions with very smooth surfaces and also may be molded satisfactorily for 5 minutes at 300° F. to give transparent, flexible, snappy sheets. The product has a tensile strength of about 6400 pounds per square inch, an elongation of 650%, 300% modulus of 900 pounds per square inch, immeasurable weight loss when tested for abrasion resistance in the Taber apparatus with maximum load and the coarsest wheel, Graves angle tear of 28 pounds per 0.1 inch and very low compression set. This strong elastic material has every outward appearance of vulcanized diisocyanate-linked elastomers vulcanized with additional amounts of diisocyanate, as well as an unexpectedly high tensile strength and abrasion resistance for an elastomer. Further, when this elastomer is extended it recovers quickly when the stress is released. The product is thermoplastic and may be readily extruded and molded.

As has been stated above, the materials and ratios necessary to obtain novel and unique elastomers of this invention are quite critical. For example, when the above example is repeated with p-phenylene diisocyanate, a material is obtained which will not mill and usually crumbles into small pieces when placed on a rubber mill. When the example is repeated with tolylene diisocyanate, a soft plastic material is obtained which has practically no tensile strength and abrasion resistance and an elongation of about 1750%. Durene diisocyanate also produces a weak undesirable product. When a hydroxyl poly(ethylene oxide) is employed rather than hydroxyl poly(tetramethylene oxide), a softer, more plastic material of poorer physical properties and abrasion resistance is obtained. When less than about 1.5 mols of diphenyl diisocyanate and 0.5 mol of the glycol are employed, a soft, weak, tacky material is obtained.

*Example II*

Example I is repeated with decanediol-1,10 employed in place of butanediol-1,4 as the glycol, and an excellent elastomeric product is obtained which has good processing and extrusion characteristics, tensile strength of 4900 pounds per square inch, an elongation of 730% and a Graves tear value of 32.

*Example III*

Example I is repeated with hydroxyl poly(tetramethylene oxide) having a molecular weight of 890. Reactants in a ratio of 1.0 mol of hydroxyl poly(tetramethylene oxide), 1.06 mols of butanediol-1,4 and 2.06 mols of diphenyl methane-p,p'-diisocyanate are employed. The resulting reaction product is a tough, clear, snappy elastomer having a Shore "A" hardness of 83 which can be milled at 220° F. The product has a tensile strength of about 5500 pounds per square inch, an elongation of 650%, a 300% modulus of 1025 pounds per square inch and a Graves angle tear of 39.

Example IV

Example I above is repeated with bitolylene diisocyanate employed in place of diphenyl methane-p,p'-diisocyanate. The resulting product has a Shore "A" hardness of 72, a tensile strength of 6800 pounds per square inch, an elongation of 710%, a 300% modulus of 1200 pounds per square inch and a Graves angle tear value of 50. This product has a Gehman freeze value of —74° C. and compression set at room temperature of 1.4.

Example V

The procedure of Example I is repeated with reactants in the following molar ratios: 1.0 mol of hydroxyl poly(tetramethylene oxide) molecular weight 3020, 6.0 mols of butanediol-1,4 and 7.0 mols of diphenyl methane-p,p'-diisocyanate and the resulting product is a strong snappy elastomer having excellent processing characteristics and a Graves tear value of 55.

As a consequence of the valuable balance of physical properties of the elastomeric polyurethanes of this invention, the materials may be used to coat wire, as decorative and protective coating materials, as molding and extrusion compositions, in the form of calendered film, oil resistant tubing, molded articles and the like. Ease of fabrication is a valuable attribute of these materials since no further compounding, curing or vulcanizing or other treatments are required to develop the optimum physical properties of the elastomer and the processor may form the material directly into useful articles from the elastomer as received if desired.

Although representative embodiments of the invention have been specifically described, it is not intended that the invention be limited solely thereto since it will be apparent to those skilled in the art that modifications and variations may be made without departing from the spirit and scope of the invention as defined in the appended claims.

I claim:

1. A polyurethane elastomer comprising the reaction product of heating under essentially anhydrous conditions (1) a mixture of one mol of a hydroxyl poly(polymethylene oxide) of the formula $HO[(CH_2)_nO]_xH$ wherein $n$ is a number from 3 to 6 and $x$ is an integer greater than 7 having a molecular weight of from about 800 to about 4,000 and about from 0.5 to 9.0 mols of a saturated aliphatic glycol containing from 4 to 12 carbon atoms and (2) from about 1.5 to 10 mols of a diphenyl diisocyanate having the formula

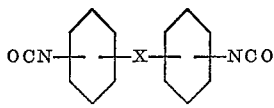

where X is selected from the class consisting of a valence bond, an alkylene radical containing from 1 to 5 carbon atoms, a NR radical where R is an alkyl group, an oxygen radical, a sulfur radical and a sulfonyl radical, the molar amount of said hydroxyl poly(polymethylene oxide) and said glycol combined being substantially equivalent to the molar amount of said diphenyl diisocyanate.

2. A polyurethane elastomer comprising the reaction product of heating under essentially anhydrous conditions (1) a mixture of one mol of hydroxyl poly(tetramethylene oxide) having a molecular weight of from about 800 to 4,000 and from about 0.5 to 9.0 mols of an alkylene glycol containing from 4 to 10 carbon atoms and (2) from about 1.5 to 10 mols of a diphenyl methane diisocyanate having the formula

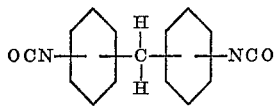

the molar amount of said hydroxyl poly(tetramethylene oxide) and said glycol being essentially equivalent to the molar amount of said diphenyl methane diisocyanate.

3. A polyurethane elastomer comprising the reaction product of heating under essentially anhydrous conditions (1) a mixture of one mol of a hydroxyl poly(tetramethylene oxide) having a molecular weight of from about 800 to 4,000 and from about 1.0 to 3.5 mols of an alkylene glycol containing from 4 to 10 carbon atoms, and (2) from about 2.0 to 4.5 mols of a diphenyl methane diisocyanate having the formula

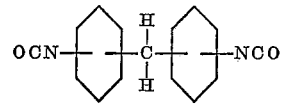

the molar amount of said hydroxyl poly(tetramethylene oxide) and said alkylene glycol combined being essentially equivalent to the molar amount of said diphenyl methane diisocyanate.

4. A polyurethane elastomer comprising the reaction product of heating under essentially anhydrous conditions (1) a mixture of one mol of hydroxyl poly-(tetramethylene oxide) having a molecular weight from about 900 to 3,000 and from about 1.0 to 2.0 mols of an alkylene glycol of the formula $HO(CH_2)_nOH$ wherein $n$ is a number from 4 to 6, and (2) about from 2.0 to 3.0 mols of a diphenyl methane diisocyanate having the formula

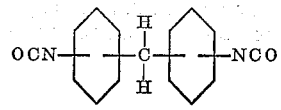

the molar amount of said hydroxyl poly(tetramethylene oxide) and said alkylene glycol combined being essentially equivalent to the molar amount of said diphenyl methane diisocyanate.

5. A polyurethane elastomer comprising the reaction product of heating under essentially anhydrous conditions (1) a mixture of one mol of hydroxyl poly(tetramethylene oxide) having a molecular weight from about 900 to about 3,000 and 1.0 mol of butanediol-1,4 and (2) 2.0 mols of diphenyl methane-p,p'-diisocyanate having the formula

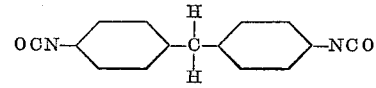

6. A polyurethane elastomer comprising the reaction product of heating under essentially moisture-free conditions (1) a mixture of one mol of a hydroxyl poly(polymethylene oxide) of the formula $HO[(CH_2)_nO]_xH$ wherein $n$ is a number from 3 to 6 and $x$ is in an integer greater than 7 having a molecular weight of about from 800 to 4,000 and from about 0.5 to 9.0 mols of a saturated aliphatic glycol containing from 4 to 12 carbon atoms, said mixture having a hydroxyl number of from about 185 to 250 and an average hydroxyl number molecular weight of about from 450 to 600, and (2) from about 1.5 to 10 mols of a diphenyl di-isocyanate having the formula

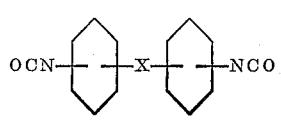

where X is selected from the class consisting of a valence bond, an alkylene radical containing from 1 to 5 carbon atoms, a NR radical where R is an alkyl group, an oxygen radical, a sulfur radical and a sulfonyl radical, said diisocyanate being present in a molar amount essentially equivalent to the molar amount of said hydroxyl poly(polymethylene oxide) and said aliphatic glycol combined.

7. A polyurethane elastomer comprising the reaction product of heating (1) a mixture of one mol of hydroxyl poly(tetramethylene oxide) having a molecular weight from about 900 to about 3,000 and from about 1.0 to 3.5 mols of an alkylene glycol containing from 4 to 10 carbon atoms, said mixture having a hydroxyl number of from about 200 to 225 and having an average hydroxyl number molecular weight of from about 500 to 550, and (2) from about 2.0 to 4.5 mols of a diphenyl methane diisocyanate having the formula

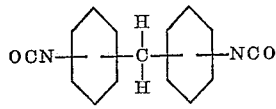

said diisocyanate being used in a molar amount equivalent to the molar amount of said hydroxyl poly(tetramethylene oxide) and said alkylene glycol combined, and the reaction mixture of (1) and (2) containing less than about 0.1% water.

8. The method for preparing a polyurethane elastomer comprising reacting under the influence of heat and under essentially anhydrous conditions (1) a mixture of one mol of a hydroxyl poly(polymethylene oxide) of the formula $HO[(CH_2)_nO]_xH$ wherein $n$ is a number from 3 to 6 and $x$ is an integer greater than 7 and having a molecular weight of from about 800 to about 4,000 and from 0.5 to 9.0 mols of a saturated aliphatic glycol containing from 4 to 12 carbon atoms, and (2) from about 1.5 to 10.0 mols of a diphenyl diisocyanate having the formula

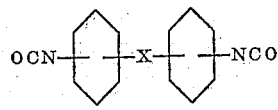

where X is selected from the class consisting of a valence bond, an alkylene radical containing from 1 to 5 carbon atoms, a NR radical where R is an alkyl group, an oxygen radical, a sulfur radical and a sulfonyl radical, the molar amount of said poly(polymethylene oxide) and said aliphatic glycol combined being substantially equivalent to the molar amount of said diphenyl diisocyanate.

References Cited in the file of this patent
UNITED STATES PATENTS

| | | |
|---|---|---|
| 2,734,045 | Nelson | Feb. 7, 1956 |
| 2,808,391 | Pattison | Oct. 1, 1957 |

FOREIGN PATENTS

| | | |
|---|---|---|
| 733,624 | Great Britain | July 13, 1955 |
| 1,108,785 | France | Sept. 14, 1955 |

OTHER REFERENCES

Heiss et al.: "Industrial and Engineering Chemistry," pages 1498–1503, vol. 46, No. 7 (July 1954). (Copy in Scientific Library.)